W. KELSO.
COUPLING AND YOKE CONNECTION.
APPLICATION FILED AUG. 2, 1920.

1,404,860.

Patented Jan. 31, 1922.
5 SHEETS—SHEET 1.

Witness
Edwin L. Bradford

Inventor
William Kelso
By Ritter & Ritter
his Attorneys

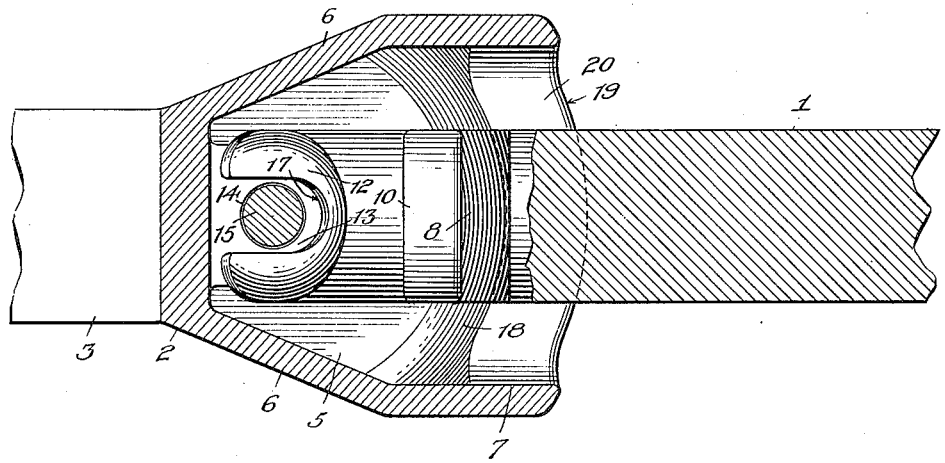
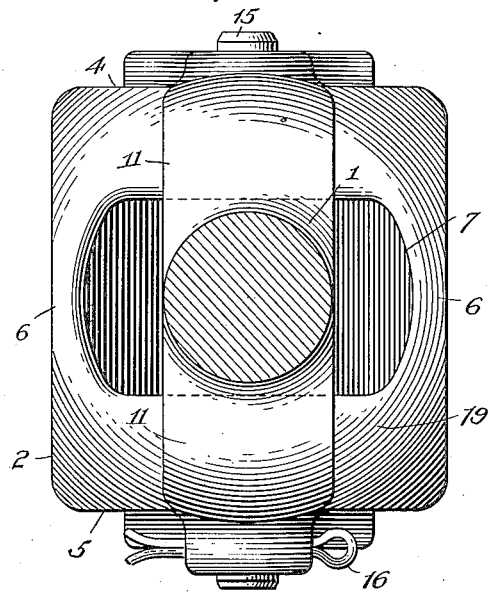
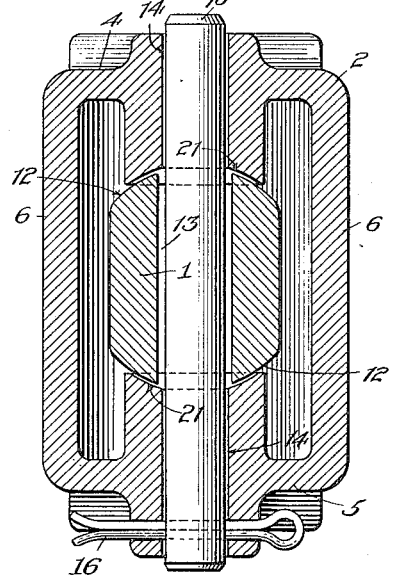

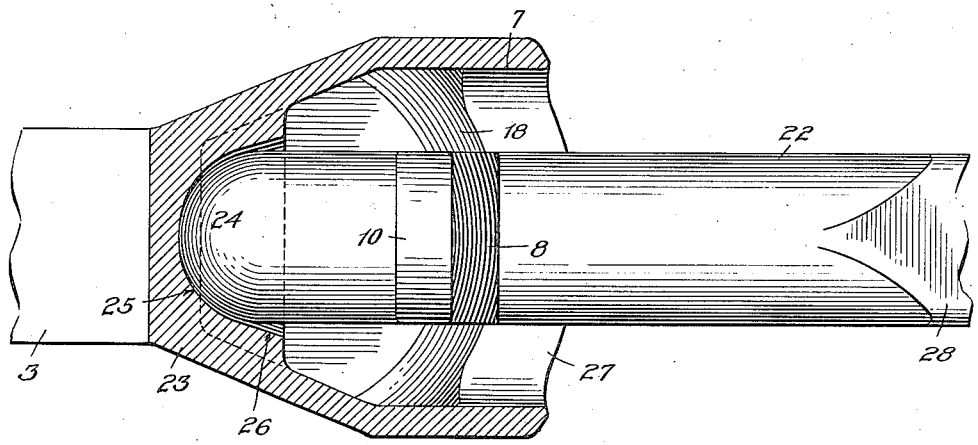
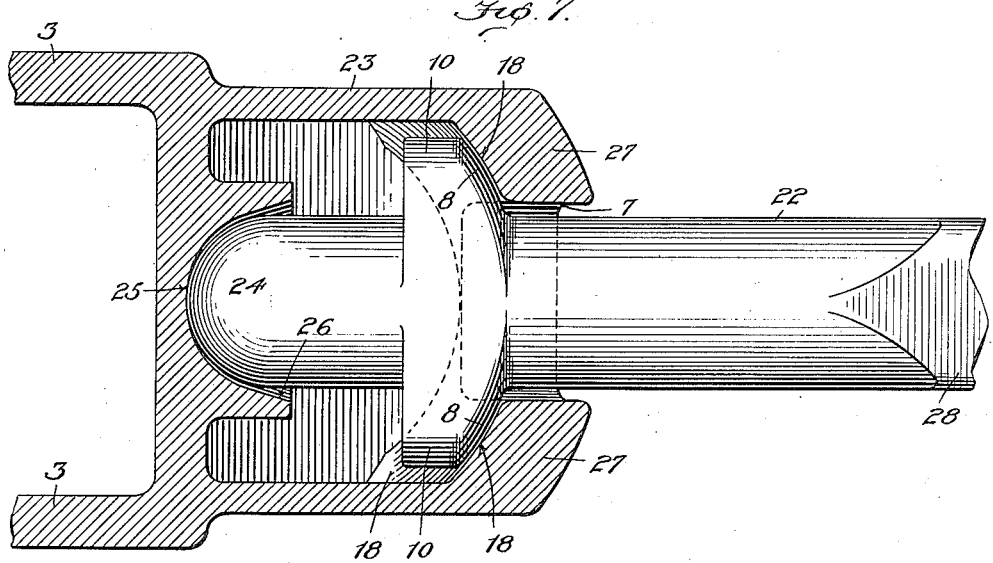

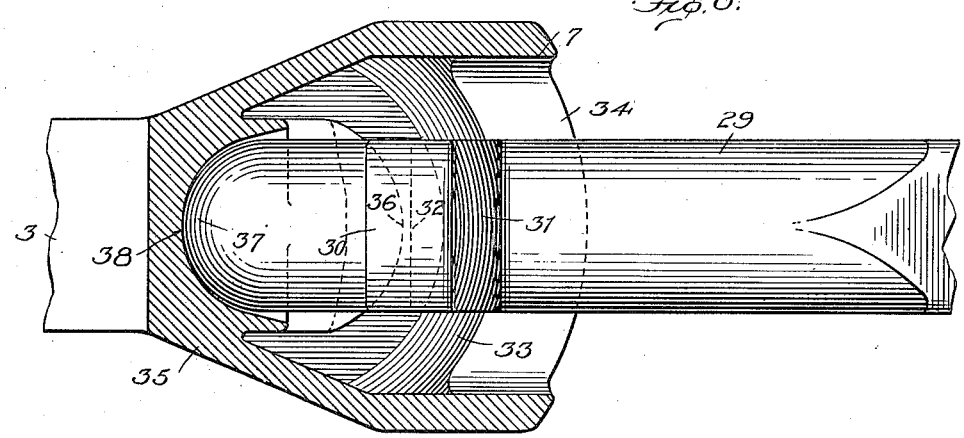
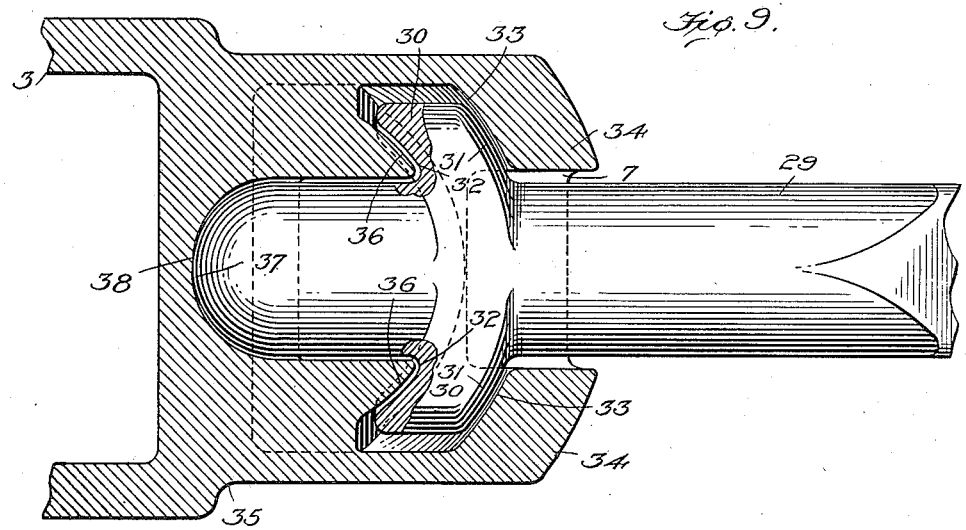

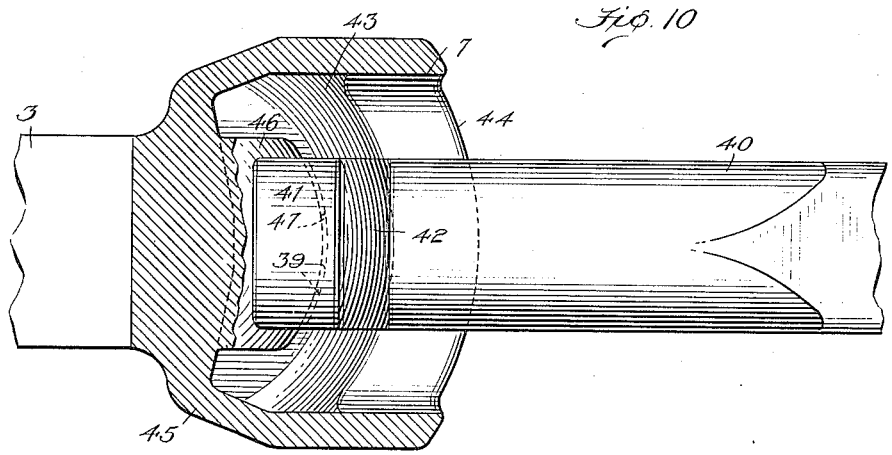
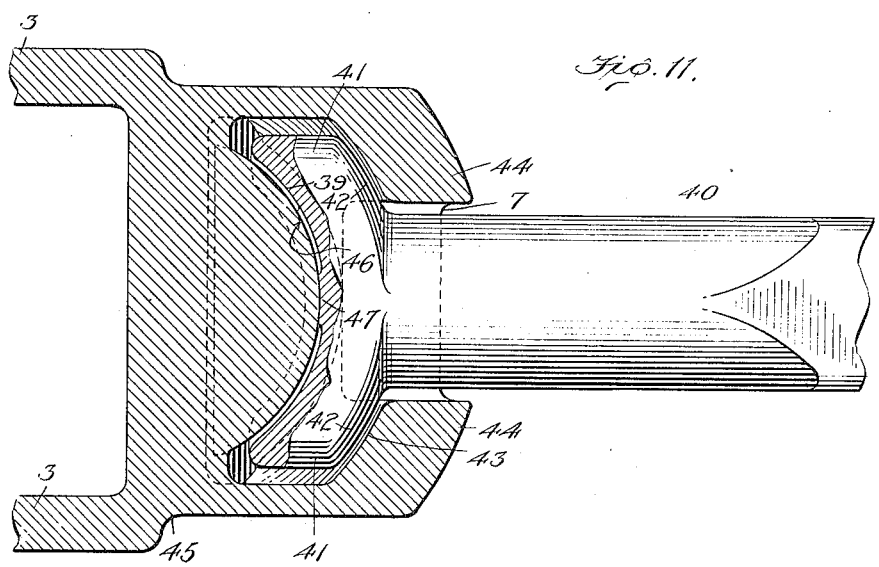

UNITED STATES PATENT OFFICE.

WILLIAM KELSO, OF PITTSBURGH, PENNSYLVANIA, ASSIGNOR TO THE McCONWAY & TORLEY COMPANY, OF PITTSBURGH, PENNSYLVANIA, A CORPORATION OF PENNSYLVANIA.

COUPLING AND YOKE CONNECTION.

1,404,860.   Specification of Letters Patent.   Patented Jan. 31, 1922.

Application filed August 2, 1920. Serial No. 400,675.

*To all whom it may concern:*

Be it known that I, WILLIAM KELSO, a citizen of the United States, residing at Pittsburgh, in the county of Allegheny and State of Pennsylvania, have invented certain new and useful Improvements in Coupling and Yoke Connections; and I do hereby declare the following to be a full, clear, and exact description of the invention, such as will enable others skilled in the art to which it appertains to make and use the same.

My invention relates to a coupler and yoke connection for draft appliances of railway cars, and has for its object to provide means for connecting a car coupler and yoke in a simple and efficient manner permitting the coupler to have lateral and vertical swinging movements with respect to the yoke as may be required in service. A further object of the invention is to provide a jointed interlocking connection between the coupler and yoke allowing these parts to be readily assembled and disassembled.

The principal feature of the invention whereby these objects are accomplished consists in providing the stem of a car coupler with a spherically curved bearing face and in forming the yoke at its forward end with an aperture which is adapted to permit the passage of the bearing face of the coupler, the yoke being provided with a spherically curved bearing face adapted to engage the correspondingly curved face of the coupler stem, and the yoke also being provided with integrally united means on opposite sides of its stem receiving aperture engaging the coupler stem so as to interlock therewith and prevent separation of the coupler and yoke when the coupler is subjected to strains in service. Minor features of the invention, residing in special combinations and advantageous structural forms, will hereinafter appear.

In the drawings illustrating preferred embodiments of the invention, the scope whereof is pointed out in the claims:—

Figure 3 is a horizontal central section of the construction illustrated in Figs. 1 and 2, the rear end of the coupler stem being in plan.

Figure 4 is a section taken on the line 4—4, Fig. 1.

Figure 5 is a section on the line 5—5, Fig. 1.

Figure 6 is a horizontal section of a modified construction involving the principle of my invention, the rear end of the coupler stem being in plan.

Figure 7 is a vertical central section of the construction illustrated in Fig. 6, the rear end of the coupler stem being shown in side elevation.

Figure 8 is a horizontal section of a modified form of the invention, the rear end of the coupler stem being in plan.

Figure 9 is a view, partly in elevation and partly in vertical central section, of the construction shown in Fig. 8.

Figure 10 is a view, partly in plan and partly in horizontal section, of another modified form of the invention.

Figure 11 is a view, partly in vertical central section and partly in elevation, of the form of construction illustrated in Fig. 10.

Figure 1:
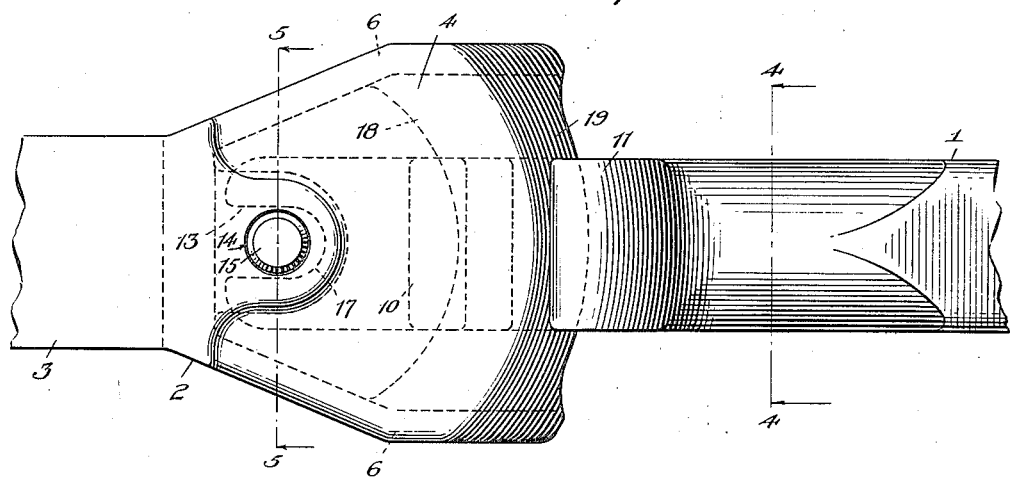
Figure 1 is a plan view of a car coupler and draft yoke having a form of connection embodying the principle of my invention, the head of the coupler and the rear portion of the yoke being broken away.
Figure 2:
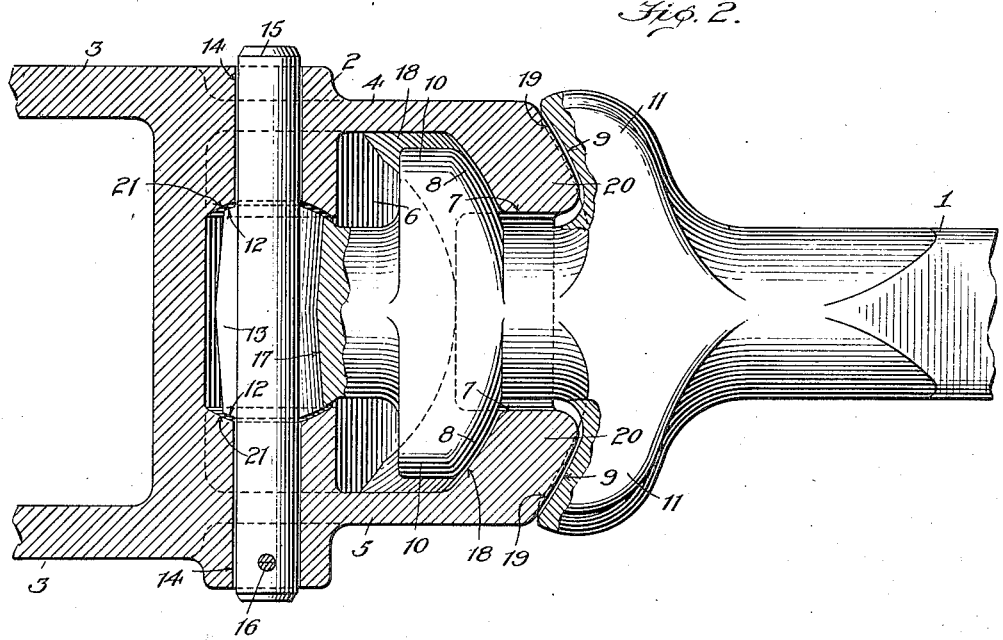
Figure 2 is a view, partly in elevation and partly in vertical section, of the construction illustrated in Fig. 1.

In the drawings, 1 is the stem of a car coupler and 2 is a draft yoke. The yoke is illustrated as of the so-called vertical type, that is to say, the arms 3 thereof, which are connected at their rear ends and receive between them the cushioning unit (not shown), are arranged in vertical rather than in horizontal alinement as is the case in the so-called horizontal type of yoke, but this feature of construction forms no part of my invention and is a matter of choice, to be varied as may be required to suit the character of cushioning unit and car construction on which the draft appliance is mounted. The forward end of the yoke by which the jointed connection is made with the coupler is, as shown, preferably of hooded form having integrally united top, bottom and side walls 4, 5, and 6, 6, respectively, and having at its forward end a horizontally elongated aperture 7 through which the rear end of the coupler stem 1 is adapted to pass when the coupler and yoke are being assembled or disassembled. As shown in Fig. 2, the vertical height of the aperture 7 is somewhat greater than the height of the adjacent portion of the coupler stem 1, clearance thus being afforded to allow the latter to swing vertically with respect to the draft yoke 2.

Toward its rear end the stem of the coupler is provided with forwardly facing convex spherical bearing faces 8 and preferably also with rearwardly facing spherically curved concave bearing faces 9 which are concentric with the bearing faces 8, but whose radius of curvature is somewhat greater so that the bearing faces 8 and 9 are spaced radially from each other. To lighten the structure and also to render it compact, the bearing faces 8 of the coupler stem are preferably formed on vertically extending lugs 10 which project in opposite directions from the body of the coupler stem. The concave spherical faces 9 are likewise preferably formed on a pair of oppositely extending lugs or projections 11 formed as integral parts of the coupler stem. The transverse thickness of the coupler stem and the distance between the outer ends of the lugs 10 thereof are such that when the coupler is rotated on its longitudinal axis one quarter turn from its normal or assembled position, the said lugs 10 are in position to pass through the aperture 7 in the outer end of the hooded portion of the yoke, it then being only necessary to pull the coupler forward in order to disconnect it from the yoke 2. Rearwardly of the bearing faces 8 and 9, and curved concentrically therewith, the coupler stem 1 is preferably provided with upper and lower spherically curved bearing faces 12 which are intersected by a vertically extending keyway 13 through which and through suitable apertures 14 in the yoke a pin or key 15 extends. The key 15, which preferably is downwardly removable, may be conveniently retained in assembled position by means of a cotter 16 which passes through holes in the under side of the yoke. This key constitutes means for preventing disassembly of the coupler and yoke, in that it prevents the coupler from being rotated on its longitudinal axis to the position required to permit the lugs 10 of the coupler stem to pass through the aperture 7 of the yoke. The keyway 13, which may be in the form of a rearwardly opening slot, is made sufficiently large to allow for all desired service movements of the coupler with respect to the yoke, its forward wall 17 being preferably flared or inclined outwardly from the center in opposite directions, as illustrated in Fig. 2.

The yoke 2 is provided with concentric spherical bearing faces corresponding respectively to the similarly curved bearing faces 8, 9 and 12 of the coupler stem. The bearing faces 18 and 19 of the yoke, which correspond respectively to the convexly curved bearing face 8 and the concavely curved bearing face 9 of the coupler stem, are arranged on opposite sides of the aperture 7 in the yoke and form the inner and outer surfaces, respectively, of portions 20 of the yoke which intervene between the neighboring projections 10 and 1 of the coupler stem 1. The spherical surfaces 18 and 19 are extended laterally to allow the coupler to have a wide range of lateral swinging movement, and they are also of sufficient vertical extent to permit the coupler to have the desired range of vertical movement. The upper and lower spherical bearing faces 21 formed on the interior of the hooded portion of the yoke cooperate with the bearing faces 12 at the rear end of the coupler stem and support and center the rear end of the coupler while permitting it to swing or rotate in any direction. Draft strains imparted to the coupler in service are transferred to the yoke 2 through the engagement of the projections 10 on the coupler stem with the bearing faces 18 of the yoke, while buffing strains to which the coupler are subjected are transferred to the yoke by the engagement of the projections 11 of the coupler stem with the convexly curved bearing faces 19 on the outer end of the yoke.

If it should become necessary to detach the coupler from the yoke for the purpose of replacement or making repairs to either of these parts, such disassembly can be effected by removing the key 15, then rotating the coupler until the projections 10 thereof are in position to pass through the apertures 7 of the yoke, and finally pulling the coupler forwardly until the rear end of its stem 1 is withdrawn from the hooded portion of the yoke. The assembly of the coupler and yoke is effected by performing these steps in the reverse order.

In the modified form of construction shown in Figs. 6 and 7 the projections 11 of the coupler stem for transmitting buffing shocks to the yoke are dispensed with and the rear end of the coupler stem is designed to perform that function. The coupler stem 22 of the modified construction is provided with oppositely disposed transversely extending projections 10 having spherically curved bearing faces 8 which are adapted to cooperate with concave concentric spherical bearing faces 18 upon the interior of the hooded yoke 23 adjacent the aperture 7 in its forward end. These several features, as well as the yoke arms 3, correspond in function and preferably in form to the features of construction indicated by corresponding reference numerals and heretofore described. The rear end of the coupler stem 22 is provided with a spherical bearing face 24 which is concentric with the bearing faces 8 and is preferably of convex form. The bearing face 24 is adapted to be seated upon a correspondingly curved spherical bearing surface 25 formed on the yoke 23 at the inner end of the hard portion thereof, the forward portion 26 of this bearing surface being preferably somewhat flared so as to avoid interference with the portion of the coupler stem which is adjacent to but in advance of the spherical bearing 24. When the coupler is subjected to pulling in service this strain is transmitted to the yoke 23 by the projections 10 which engage the overlapping portions 27 of the coupler on which the spherical bearings 18 are formed and which are disposed upon opposite sides of the aperture 7 of the yoke. Buffing shocks received by the coupler are transmitted to the yoke through the engagement of the bearing face 24 at the rear end of the coupler stem with the bearing face 25 of the yoke. This modified form of my invention is assembled by turning the coupler on its longitudinal axis until the projections 10 are in position to pass through the aperture 7 of the yoke, after which the coupler is pushed rearwardly until the said projections are within the hooded portion of the yoke and the coupler is thereafter rotated upon its longitudinal axis until the projections 10 stand behind the portions 27 of the yoke in normal relation. The construction shown in Figs. 6 and 7 does not employ a key for preventing the coupler from being rotated to a position permitting disassembly of the parts, but the rectangular portion 28 of the coupler stem which rests upon the carry iron (not shown) enables the coupler by its own weight to retain its normal interlocked relation with the yoke.

The modified form of the invention illustrated in Figs. 8 and 9 exhibits certain features of construction embodied in both forms of the invention heretofore described. In this construction the coupler stem 29 is provided with oppositely disposed transversely extending projections 30 having front and rear concentric spherical bearing faces 31 and 32, respectively. The forward bearing faces 31 are adapted to cooperate in draft with the correspondingly curved bearing faces 33 formed on the inner sides of the portions 34 of the yoke which overlap the projections 30 upon the coupler stem. The concave rearwardly facing bearing surfaces 32 are adapted to transmit buffing shocks to the yoke 35 by engaging the forwardly facing correspondingly curved bearing faces 36 with which the yoke is provided on the interior of its hooded portion. The rear end of the coupler stem has a spherical bearing face 37 concentric with the bearing faces 31 and 32 and preferably of convex form. The bearing face 37 is seated upon a corresponding spherical bearing surface 38 with which the yoke is provided at the inner end of its hooded portion. The hooded end of the yoke has at its forward end between the portions 34 an aperture 7 through which the oppositely disposed projections 30 upon the coupler stem may be inserted and withdrawn in a manner heretofore described; and rearwardly of its hooded portion the yoke may be provided with the usual spaced arms 3. To facilitate ease of assembly when the mechanism is new and to eliminate the necessity of accurate fitting, it is preferred, as illustrated in the drawings, to allow a slight clearance between the bearing faces 32 and 36 when the device is first put in service. As soon as wear between the spherical rear end 37 of the coupler stem and the corresponding spherical bearing surface 38 of the yoke has proceeded somewhat, the bearing faces 32 and 36 will engage each other in resisting buffing shocks, so that buffing will be distributed over a large area. The allowance of this initial clearance between the cooperating faces 32 and 36 insures the central application of buffing shocks to the yoke and also results through wear in an intimate and extensive contact between the curved bearing faces 32 and 36.

The form of the invention illustrated in Figs. 10 and 11 dispenses with the convex spherical bearing 37 employed in the structure shown in Figs. 8 and 9 and effects a decrease in the length of the hooded portion of the yoke by making the buffing bearing 39 at the rear end of the coupler stem 40 a concave spherical surface extending across the central portion of the rear end of the coupler stem as well as across the lugs 41 projecting from opposite sides of said stem. The forward faces 42 of the lugs 41 are curved cylindrically concentric rear faces, and are adapted when the coupler operates in draft to engage correspondingly curved bearing faces 43 upon the interior of the portions 44 of the yoke 45. Between the portions 44 of the yoke is an aperture 7 through which, as heretofore described in respect to the other forms of the invention, the oppositely disposed projections 41 of the coupler stem are adapted to pass when the structure is being assembled or disassembled.

Within its hooded portion the yoke is provided with a convexly curved spherical bearing surface 46 which is concentric with and in buffing is adapted to engage the corresponding bearing surface 39 at the rear end of the coupler stem. The yoke may be provided with the usual spaced parallel arms 3 between which the cushioning unit (not shown) of the draft rigging is received.

To facilitate initial assembly of the parts and reduce fitting operations, the central portion of the spherical bearing surface 39 is preferably of a radius somewhat less than its outer portions, thus providing a slight projection 47 which engages the bearing surface 46 of the yoke when the device is initially assembled. By the swinging movements of the coupler stem incident to service this projection is worn away and the entire bearing surface 39 at the rear end of the coupler stem comes into perfect and extended contact with the correspondingly curved bearing 46 of the yoke.

I claim:—

1. In a device of the character indicated, the combination with a coupler having a stem provided with a portion having a spherically curved bearing face, of a yoke provided at its forward end with a forwardly opening aperture adapted to permit the passage of said spherically curved portion, said yoke having a spherically curved bearing face adapted to engage said spherically curved face of said coupler stem, and said yoke being provided with integrally united means adapted to engage said coupler stem and prevent separation of said coupler and yoke when the coupler is subjected to draft strains.

2. In a device of the character indicated, the combination with a coupler having a stem provided with transverse projections having spherically curved faces, said stem also having to the rear of said projections a spherically curved portion, of a yoke having a hooded forward end formed with an aperture adapted to permit the passage of said projections and said spherically curved portion, said yoke having integrally united spherically curved faces on opposite sides of said aperture adapted to engage said spherically curved faces of said projections, and said yoke also having a curved bearing face adapted to engage the said spherical portion of said coupler stem which is to the rear of said projections.

3. In a device of the character indicated, the combination with a coupler having a stem provided at its rear end with a plurality of curved faces of unequal radaii, of a yoke having a plurality of bearing faces adapted respectively to engage said curved faces of said stem, said yoke having at its forward end an aperture adapted to permit the passage of the rear end of said stem by a movement of said coupler in its direction of length, and said yoke and coupler being relatively rotatable on the longitudinal axis of said coupler to assemble or disassemble said parts.

4. In a device of the character indicated, the combination with a coupler having a stem provided with a plurality of spaced projections having concentrically curved faces, of a yoke having a forwardly opening aperture adapted to permit the passage of some of said projections, said yoke having on opposite sides of said aperture portions respectively extending between the adjacent projections of said coupler stem and provided with concentrically curved bearing faces corresponding to the curved faces of said projections.

5. In a device of the character indicated, the combination with a coupler having a stem provided with a concave spherical bearing face, of a yoke having an exterior bearing face which is convexly curved to correspond to the said concave spherical bearing face and which is adapted to engage said concave bearing face, and means for movably connecting said coupler and yoke.

6. In a device of the character indicated, the combination with a coupler provided with a spherically curved bearing face, of a yoke having a spherical exterior bearing face adapted to engage the said bearing face of said coupler, and means for movably connecting said coupler and yoke.

7. In a device of the character indicated, the combination with a coupler having a stem provided with a plurality of spaced sets of outwardly extending projections having concentric spherical bearing faces, of a yoke having spherically curved concentric bearing faces adapted respectively to engage the said bearing faces of said projections, the center of curvature of said concentric bearing faces being to the rear of said faces.

8. In a device of the character indicated, the combination with a coupler having a stem provided with a plurality of spaced sets of projections having concentric spherical bearing faces, the bearing faces of one set of projections being concave and the neighboring bearing faces of the adjacent set being convex, of a yoke having portions adapted to intervene between said sets of projections and being provided with curved faces adapted to engage the said bearing faces of said projections.

9. In a device of the character indicated, the combination with a coupler having a stem provided with a plurality of curved bearing faces, of a yoke having a hooded forward end provided with an aperture permitting the passage of the said bearing faces of said stem by a movement of said coupler in its direction of length, said yoke and said coupler being relatively rotatable on the longitudinal axis of said coupler to assemble and disassemble said parts, said yoke having bearing faces adapted to engage said bearing faces of the coupler stem, and means for preventing a relative rotation of the yoke and coupler permitting their disassembly, said means extending through said yoke and coupler and being adapted to permit the coupler to swing with respect to said yoke.

10. In a device of the character indicated, the combination with a coupler having a stem provided with a plurality of spaced sets of projections formed with spherical bearing faces of unequal radaii and provided rearwardly of said bearing faces with an opening adapted to receive a key, of a yoke having bearing faces adapted to engage said bearing faces of the coupler stem, and a key engaging said yoke and entering said opening in said stem, said key constituting means for preventing disassembly of said coupler and yoke.

11. In a device of the character indicated, the combination with a coupler having a stem provided with a plurality of spaced sets of spherical bearing faces of unequal radii and provided rearwardly of said bearing faces with a keyway and spherical faces intersected by said key-way, of a hooded yoke having spherical bearing faces respectively corresponding to and adapted to engage the said spherical faces of said coupler stem, and a key engaging said yoke and extending through said key-way, said key constituting means for preventing disassembly of said coupler and yoke while permitting said coupler to swing with respect to said yoke.

In testimony whereof I affix my signature.

WILLIAM KELSO.